(12) United States Patent  
White et al.

(10) Patent No.: US 7,974,218 B2  
(45) Date of Patent: Jul. 5, 2011

(54) INTERSECTION-BASED CONFIGURATION MANAGEMENT

(75) Inventors: John G. White, Cary, NC (US); Keith R. Schomburg, Apex, NC (US); Ravi Shankar Jandyala, Durham, NC (US)

(73) Assignee: Cisco Technology, Inc., San Jose, CA (US)

( * ) Notice: Subject to any disclaimer, the term of this patent is extended or adjusted under 35 U.S.C. 154(b) by 398 days.

(21) Appl. No.: 11/738,321

(22) Filed: Apr. 20, 2007

(65) Prior Publication Data

US 2008/0259922 A1 Oct. 23, 2008

(51) Int. Cl.
*H04L 12/28* (2006.01)
(52) U.S. Cl. .... 370/254; 709/223; 711/216; 711/E12.06
(58) Field of Classification Search .......... None
See application file for complete search history.

(56) References Cited

U.S. PATENT DOCUMENTS

| | | | | |
|---|---|---|---|---|
| 5,701,300 | A * | 12/1997 | Jeon et al. ........... | 370/392 |
| 6,697,380 | B1 * | 2/2004 | Egbert et al. ........ | 370/469 |
| 7,068,654 | B1 * | 6/2006 | Joseph et al. ........ | 370/392 |
| 2004/0030771 | A1 * | 2/2004 | Strassner ........... | 709/224 |
| 2005/0074015 | A1 * | 4/2005 | Chari et al. ........ | 370/400 |
| 2006/0047791 | A1 * | 3/2006 | Bahl ............... | 709/220 |
| 2007/0016670 | A1 * | 1/2007 | Cooper ............ | 709/224 |

OTHER PUBLICATIONS

Hash table—Wikipedia, the free encyclopedia, http://en.wikipedia.org/wiki/Hash_table, Apr. 16, 2007, 10 pages.
Cisco Systems, Inc., Multi-Layer SMS Routing and Screening, 2005, 62 pages.
Cisco Systems, Inc., ITP Distributed Short Message Routing (DSMR), 2005, 66 pages.
Cisco Systems, Inc., Cisco Signaling Gateway Manager 4.1 Datasheet, Feb. 2006, 7 pages.
Cisco Systems, Inc., Ciscoworks Resourse Manager Essentials 4.0 Data Sheet, 2005, 6 pages.

* cited by examiner

*Primary Examiner* — Daniel J Ryman
*Assistant Examiner* — Tito Pham
(74) *Attorney, Agent, or Firm* — Haynes and Boone, LLP

(57) ABSTRACT

A configuration management system and related methods are provided to facilitate intersection-based management of configuration information for network devices. In one example, a method includes polling a plurality of network devices to determine address entries stored by address tables of the network devices. The method also includes applying a hash function to the address entries to determine a plurality of key-value associations. The method further includes maintaining a hash table comprising the key-value associations. Each key of the hash table corresponds to an address entry stored by one or more of the address tables. Each value of the hash table identities which of the address tables are storing the address entry corresponding to the associated key.

20 Claims, 8 Drawing Sheets

| | 420 | 430 |
|---|---|---|
| 410(1) | addr 4157301575 result gt 8665351243 tt 4 gti 2 | {SANFRAN/1.10.0:ansinet0, NOBHILL/2.11.0:ansinet1} |
| 410(2) | addr 4158226389 result block | {SANFRAN/1.10.0:ansinet0, NOBHILL/2.11.0:ansinet1} |
| 410(3) | | |
| 410(4) | | |
| 410(5) | addr 4158315404 exact result pc 7.4.1 ssn 231 | {NOBHILL/2.11.0:ansinet1} |
| 410(6) | | |
| 410(7) | addr 4158639456 exact result osname APPSVR3 | {SANFRAN/1.10.0:ansinet0} |
| 410(8) | addr 4156739941 result continue | {SANFRAN/1.10.0:ansinet0} |
| 410(9) | | |
| 410(10) | | |
| 410(11) | | |
| 410(12) | addr 4155508207 exact result osname APPSVR3 | {NOBHILL/2.11.0:ansinet1} |
| 410(13) | | |

| 130 | 420 | 430 |
|---|---|---|
| 410 (1) | addr 4157501575 result gt 8665351243 tl 4 gti 2 | {SANFRAN/1.10.0: ansinet0, NOBHILL/2.11.0: ansinet1, GOLDENGATE/3.12.0:ansinet} |
| 410 (2) | addr 4158226389 result block | {SANFRAN/1.10.0: ansinet0, NOBHILL/2.11.0: ansinet1} |
| 410 (3) | | |
| 410 (4) | addr 4153333580 result pc 7.7.2 ssn 43 | {GOLDENGATE/3.12.0:ansinet0} |
| 410 (5) | addr 4158315404 exact result pc 7.4.1 ssn 231 | {NOBHILL/2.11.0: ansinet0} |
| 410 (6) | | |
| 410 (7) | addr 4158639456 exact result asname APPSVR3 | {SANFRAN/1.10.0: ansinet0, GOLDENGATE/3.12.0:ansinet0} |
| 410 (8) | addr 4156739941 result continue | {SANFRAN/1.10.0: ansinet0} |
| 410 (9) | | |
| 410 (10) | | |
| 410 (11) | | |
| 410 (12) | addr 4155508207 exact result asname APPSVR3 | {NOBHILL/2.11.0: ansinet1} |
| 410 (13) | addr 4152391517 result continue | {GOLDENGATE/3.12.0:ansinet0} |

INTERSECTION-BASED CONFIGURATION MANAGEMENT

TECHNICAL FIELD

The present disclosure relates generally to the configuration of network devices.

BACKGROUND

Network devices often include address tables to facilitate the routing of data over networks. Such address tables are typically implemented with large numbers of address entries, often in the tens of thousands. In order to ensure accurate and efficient data routing, address table configurations may be updated to reflect changes to the address entries. However, managing the configuration of the address tables can be difficult for administrators due to the large numbers of address entries.

Configuration management is especially complex for implementations with multiple network devices, as each network device may include one or more address tables with many associated address entries. For example, if an administrator desires to change all instances of a particular address entry stored in multiple tables, the administrator may search each address table on each managed device for the affected entry. The time required for this search is proportional to the total number of address entries in all of the tables. Furthermore, this search must be repeated each time an address entry is changed.

In addition, conventional approaches to network device configuration management generally require administrators to manually perform redundant configuration tasks on multiple network devices, thereby increasing the possibility of user error. In particular, repeating the same configuration updates on multiple network devices can be a time consuming, error prone, and inefficient process.

Configuration management of network devices is further complicated where administrators seek to roll back configuration changes previously deployed on multiple network devices. Generally, administrators are forced to undo such changes manually one device at a time or run an appropriate script to perform the task. Roll back operations can become especially difficult in cases where an administrator seeks to undo multiple configuration changes on multiple devices. In such cases, administrators are often forced to analyze the configuration of individual devices and back off configuration changes on a device-by-device basis. Such an approach can similarly be very time consuming, error prone, and inefficient.

BRIEF DESCRIPTION OF THE DRAWINGS

FIGS. 4A-B illustrate hash tables in accordance with various embodiments of the invention.

Like element numbers in different figures represent the same or similar elements.

DESCRIPTION

Overview

Figure 1:
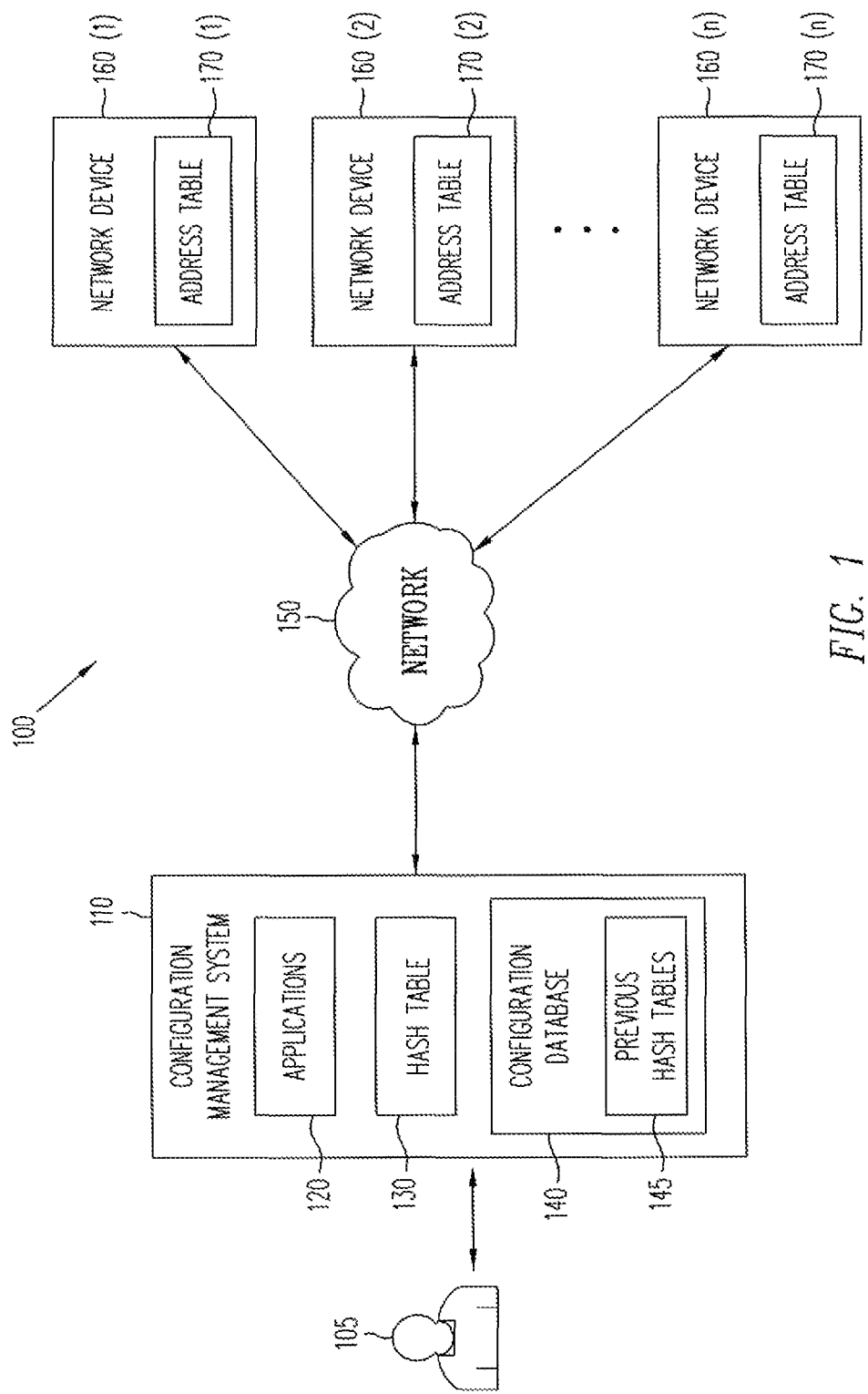
FIG. 1 illustrates a system configured to provide intersection-based network device management in accordance with an embodiment of the invention.

In accordance with an embodiment of the invention, a method includes polling a plurality of network devices to determine address entries stored by address tables of the network devices. The method also includes applying a hash function to the address entries to determine a plurality of key-value associations. The method further includes maintaining a hash table comprising the key-value associations. Each key of the hash table corresponds to an address entry stored by one or more of the address tables. Each value of the hash table identifies which of the address tables are storing the address entry corresponding to the associated key.

In accordance with another embodiment of the invention, a configuration management system includes one or more processors. The configuration management system also includes a memory storing software. The software, when executed by the one or more processors, causes the one or more processors to maintain a hash table comprising a plurality of key-value associations. Each key of the hash table corresponds to an address entry stored by one or more address tables of a plurality of network devices. Each value of the hash table identifies which of the address tables are storing the address entry corresponding to the associated key. The software, when executed by the one or more processors, also causes the one or more processors to poll the network devices to determine the address entries stored by the address tables of the network devices, and apply a hash function to the address entries to determine the key-value associations.

In accordance with another embodiment of the invention, a configuration management system includes means for polling a plurality of network devices to determine address entries stored by address tables of the network devices. The configuration management system also includes means for applying a hash function to the address entries to determine a plurality of key-value associations. The configuration management system further includes means for maintaining the key-value associations. Each key corresponds to an address entry stored by one or more of the address tables. Each value identifies which of the address tables are storing the address entry corresponding to the associated key.

These and other features and advantages will be more readily apparent from the description of example embodiments set forth below taken in conjunction with the accompanying drawings.

Description of Example Embodiments

In accordance with various embodiments described herein, a configuration management system and related methods are disclosed to facilitate intersection-based management of address tables of network devices. In one embodiment, the configuration management system includes a hash table that identifies address entries associated with one or more address tables of a plurality of network devices.

Individual hash table entries may identify address entries associated with particular address tables of one or more network devices. The particular address entries shared by more than one address table and/or network device can be conveniently determined by using keys of the hash table. Intersections (e.g., shared configuration information such as address entries) between the address tables may be used to facilitate convenient configuration management of the address tables. For example, in one embodiment, the hash table may include a plurality of key-value associations, wherein each key of the hash table corresponds to an address entry stored by one or more of the address tables. Also in this embodiment, each value of the hash table may identify which of the address tables and/or network devices are storing the address entry corresponding to the associated key. Advantageously, the key-value associations of the hash table may be used to expediently identify particular address tables and network devices affected by changes to particular address entries. Such associations may also be used to facilitate roll back of previous configuration changes deployed to the address tables.

Referring now to the drawings wherein the showings are for purposes of illustrating embodiments of the invention only, and not for purposes of limiting the same, FIG. 1 illustrates a system 100 configured to provide intersection-based network device management in accordance with an embodiment of the invention. As shown, system 100 includes a configuration management system 110 mid a plurality of network devices 160 connected with a network 150.

Network 150 may be implemented as a single network or a combination of multiple networks. For example, in various embodiments, network 150 may include the Internet or one or more intranets, land line networks, wireless networks, and/or other appropriate types of networks.

Network devices 160 may be any appropriate types of devices used to facilitate data transmission over network 150. For example, in various embodiments, network devices 160 maybe implemented as routers, switches, or other network devices. In one embodiment, network devices 160 may be implemented to route short message service (SMS) messages. In the embodiment of FIG. 1, n network devices 160 (labeled 160(1), 160(2), ..., 160(n)) are provided. However, it will be appreciated that any desired number of network devices 160 may be used.

Each of network devices 160 maintains an associated address table 170 having one or more address entries which may be used by network devices 160 to facilitate data routing over network 150. In the embodiment of FIG. 1, n address tables 170 (labeled 170(1), 170(2), ..., 170(n)) are provided, each of which is associated with a corresponding one of network devices 160. However, it will, be appreciated that any desired number of address tables 170 may be used. For example, in various embodiments, individual network devices 160 may maintain multiple address tables 170. In various embodiments, address entries of address tables 170 may be maintained in non-volatile random access memory of network devices 160, and/or may be loaded from external files through appropriate load operations performed by network devices 160.

In one embodiment, address tables 170 may be implemented as Internet Protocol transfer point (ITP) address tables which may used in the routing of SMS messages via multi-layer routing (MLR) and distributed short message routing (DSMR) features of network devices 160. In another embodiment, address tables 170 may be implemented as any appropriate type of address table implemented without duplicate and without interdependent address entries. In this regard, each address entry of a given address table 170 may be unique. For example, in such an embodiment, identical address entries may be implemented in different address tables 170, but not in the same individual address table 170. Also in such an embodiment, address entries of address tables 170 may be implemented without interdependencies between individual address entries of a given address table 170, thereby permitting individual address entries of a given address table 170 to be independently added, changed, or removed without affecting other address entries of the address table 170.

Configuration management system 110 may be used by an administrator 105 to manage the configuration of address tables 170 of network devices 160 using intersection-based configuration management techniques described herein. Configuration management system 110 may be implemented by one or more computing devices running appropriate application software 120 to perform steps of processes described herein to implement various configuration management techniques. For example, in one embodiment, application software 120 may be implemented by computer-readable program code executable by configuration management system 110.

Configuration management system 110 maintains a hash table 130 which may be used to identify address entries shared by address tables 170. Advantageously, configuration management system 110 may leverage various attributes of address tables 170 (e.g., unique and independent address entries within individual address tables 170) to determine intersections between address entries of different address tables 170. In this regard, hash table 130 may include a plurality of key-value associations to associate particular address entries of address tables 170 with one or more address tables 170 storing the address entries. For example, each key of hash table 130 may store a complete or concatenated address entry that corresponds to an address entry stored by one or more of address tables 170, and each value may identify which of the address tables 170 and/or network devices 160 are storing the address entry corresponding to the associated key.

As shown in FIG. 1, configuration management system 110 also maintains a configuration database 140 that includes one or more previous hash tables 145 corresponding one or more previous configurations of address tables 170. In this regard, configuration database 140 may maintain a configuration archive of previous versions of hash table 130 to provide historical tracking of configuration changes that are mapped by previous hash tables 145.

Figure 7:
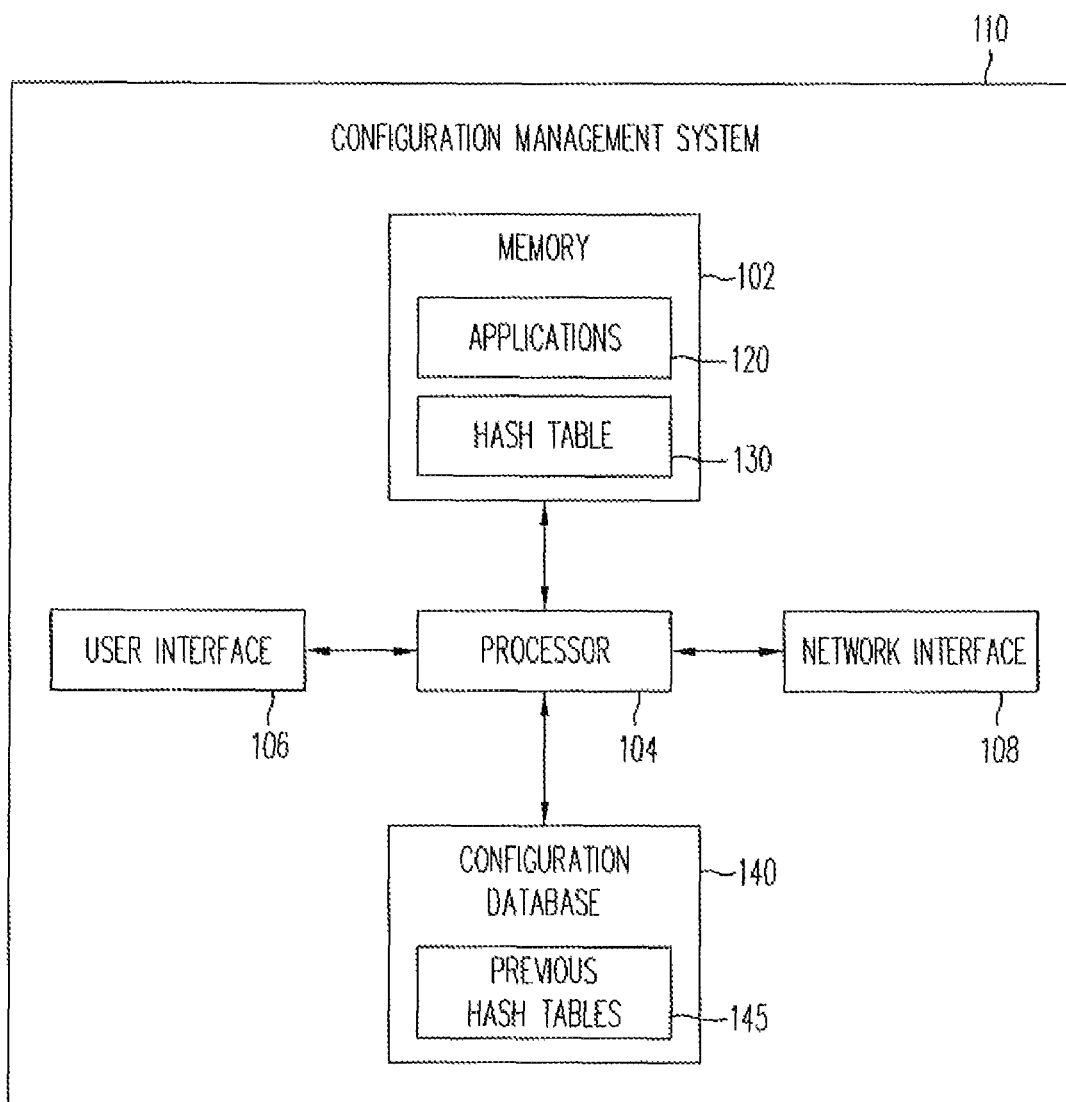
FIG. 7 illustrates a block diagram of a configuration management system in accordance with an embodiment of the invention.

FIG. 7 illustrates a block diagram showing additional details of configuration management system 110 in accordance with an embodiment of the invention. Although the block diagram of FIG. 7 is provided as an example of an implementation of configuration management system 110 in a particular computing device, it will be appreciated that any appropriate computing device implementation may be used to facilitate various features of configuration management system 110 described herein.

Configuration management system 110 includes one or more processors 104 which may be interfaced with a memory 102, a user interface block 106, a network interface block 108, and configuration database 140. In this regard, one or more processors 104 may be implemented as any appropriate processor type configured to execute instructions of application software 120 in memory 102 to perform any of the various operations of configuration management system 110 described herein. As shown, hash table 130 may also be maintained in memory 102.

User interface block 106 may be implemented with appropriate circuitry to facilitate interaction between administrator 105 and configuration management system 110 as described herein. Network interface block 108 may be implemented with appropriate circuitry to facilitate interaction between configuration management system 110, network 150, network devices 160, and address tables 170 as described herein.

Figure 2:
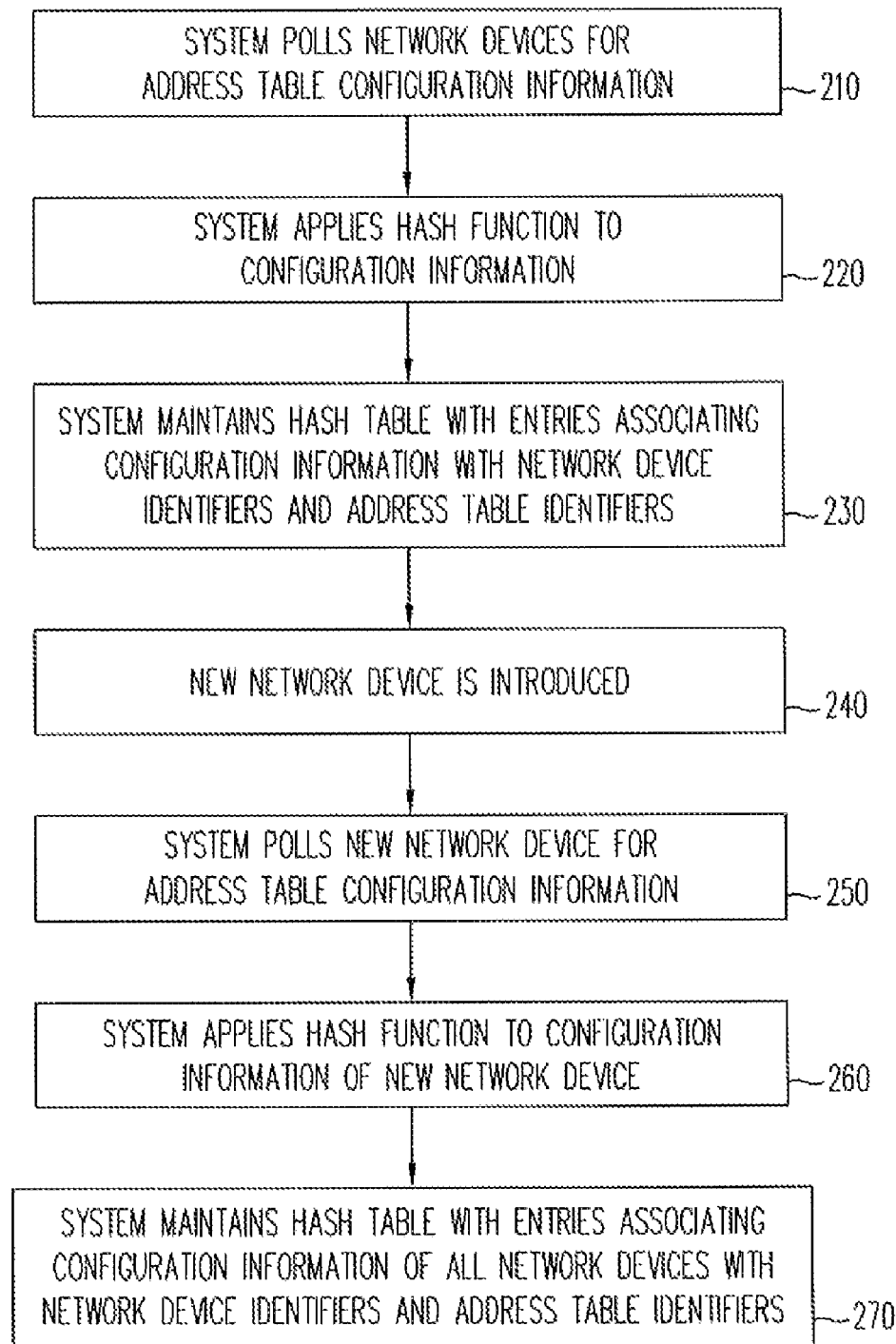
FIG. 2 illustrates a process of maintaining new configuration information using an intersection-based network device management system in accordance with an embodiment of the invention.

FIG. 2 illustrates a process of maintaining new configuration information which may be performed by configuration management system 110 in accordance with an embodiment of the invention. For example, in one embodiment, the process of FIG. 2 may be performed when configuration management system 110 begins to manage the configuration of address tables 170. In this regard, it will be assumed that prior to the process of FIG. 2, network devices 160(1) and 160(2) have been introduced to network 150, and that the remaining network devices 160(3) through 160(n) have not yet been introduced to network 150. Also prior to the process of FIG. 2, hash table 130 maintained by configuration management system 110 may be empty with no entries.

In initial step 210, configuration management system 110 polls network devices 160(1) and 160(2) for configuration information currently maintained in their associated address tables 170(1) and 170(2), respectively. For example, in one embodiment, step 210 may be performed in accordance with a simple network management protocol (SNMP) device discovery process.

Figure 3A:
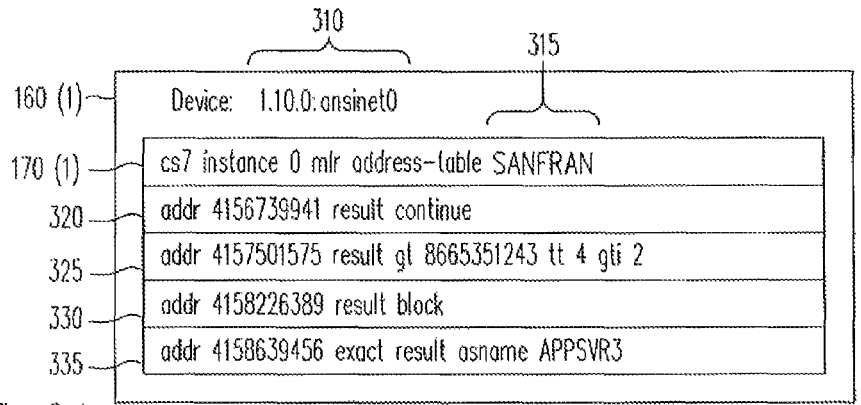
FIGS. 3A-C illustrate address tables associated with a plurality of network devices in accordance with various embodiments of the invention.
Figure 3B:
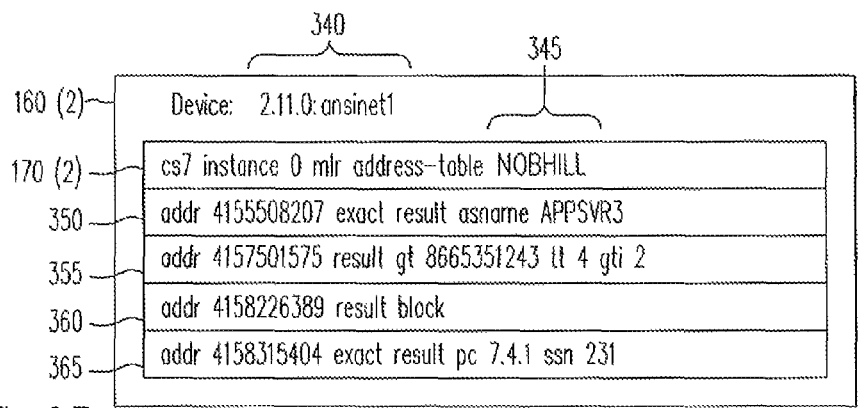

FIGS. 3A and 3B illustrate block diagrams of network devices 160(1) and 160(2) and the contents of address tables 170(1) and 170(2), respectively, during step 210 in accordance with an embodiment of the invention. As shown in FIG. 3A, network device 160(1) is associated with a device identifier 310 ("1.10.0:ansinet0"). In addition, address table 170(1) includes an address table identifier 315 ("SANFRAN"), as well as a plurality of address entries 320 through 335. Similarly, as shown in FIG. 3B, network device 160(2) is associated with a device identifier 340 ("2.11.0:ansinet1"). In addition, address table 170(2) includes an address table identifier 345 ("NOBHILL"), as well as a plurality of address entries 350 through 365. Accordingly, during step 210, configuration management system 110 may request and receive address entries 320-335 and 350-365 from network devices 160(1) and 160(2).

In step 220, configuration management system 110 applies a hash function to each of the address entries received in step 210. The hash function determines entries to be maintained in hash table 130 (step 230) that provide key-value associations to associate particular address entries with particular address tables 170. Advantageously, each address entry that is shared by two or more of address tables 170 can be represented by a single entry in hash table 130 that associates the address entry (key) with the particular address tables 170 (value) that currently share the address entry. In this regard, hash table 130 can be used by configuration management system 110 to identify the common address table entries (e.g., intersections) that are shared by address tables 170.

For example, upon inspection of FIGS. 3A and 3B, it will be appreciated that address entries 325 and 355 correspond to an intersection between address tables 170(1) and 170(2). Similarly, address entries 330 and 360 correspond to an additional intersection between address tables 170(1) and 170(2). Accordingly, configuration management system 110 creates entries in hash table 130 that provide key-value associations to associate particular address entries of address tables 170(1)/170(2) with network device identifiers 310/340 and address table identifiers 335/345.

FIG. 4A illustrates hash table 130 following the performance of step 230 in accordance with an embodiment of the invention. As shown in FIG. 4A, hash table 130 includes a plurality of entries 410 (labeled 410(1)-410(13)) arranged in a column of keys 420 and a column of values 430 associated with keys 420. In particular, entries 410(1), (2), (5), (7), (8), and (12) associate an address entry from one or both of address tables 170(1)/170(2) with one or both of network device identifiers 310/340 and one or both of address table identifiers 315/345. In addition, other entries 410(3), (4), (6), (9), (10), (11), and (13) are blank in the embodiment of FIG. 4A. It will be appreciated that although thirteen entries 410 (labeled 410(1)-410(13)) are provided in the embodiment of FIG. 4A, any desired number of entries 410 may be used.

As previously described, address entries 325 and 355 identify configuration information that is shared between address tables 170(1) and 170(2). Accordingly, hash table entry 410(1) associates the shared configuration information of address entries 325 and 355 with both of network device identifiers 310/340 and both of address table identifiers 315/345. Similarly, address entries 330 and 360 of FIGS. 3A-3B identify additional configuration information that is shared between address tables 170(1) and 170(2). Accordingly, hash table entry 410(2) associates this additional shared configuration information of address entries 330 and 360 with both of network device identifiers 310/340 and both of address table identifiers 315/345.

The remaining configuration information of FIGS. 3A-3B (e.g., address entries 320, 335, 350, and 365) is not shared between address tables 170(1) and 170(2). Accordingly, such configuration information is shown in hash table entries 410 (5), (7), (8), and (12) and is associated with only one of network device identifiers 310/340 and only one of address table identifiers 315/345.

Returning to FIG. 2, in step 240 a new network device 160 is introduced to network 150. For example, in one embodiment, network device 160(n) may be added to network 150 in step 240. In step 250, configuration management system 110 polls network device 160(n) for configuration information currently maintained in associated address table 170(n). Similar to previous step 210, in one embodiment step 250 may be performed in accordance with an SNMP device discovery process.

Figure 3C:
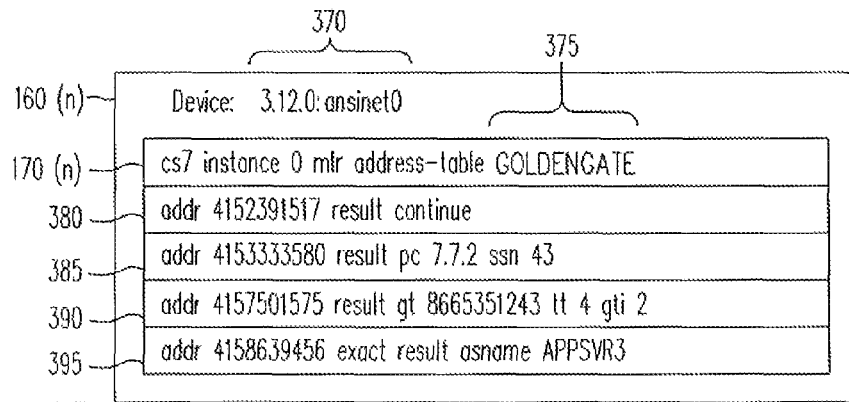

FIG. 3C illustrates a block diagram of network device 160(n) and the contents of address table 170(n) during step 250 in accordance with an embodiment of the invention. As shown in FIG. 3C, network device 160(n) is associated with a device identifier 370 ("3.12.0:ansinet0"). In addition, address table 170(n) includes an address table identifier 375 ("GOLDENGATE"), as well as a plurality of address entries 380 through 395. Accordingly, during step 250, configuration management system 110 may request and receive address entries 380-395 from network device 160(n).

In step 260, configuration management system 110 applies the hash function to each of the address entries received in step 250. Similar to previous step 230, the hash function creates and maintains entries in hash table 130 (step 270) that provide key-value associations to associate particular address entries of the new network device with particular address tables 170. As a result, following step 270, hash table 130 can be used to identify the common address table entries (e.g., intersections) that are shared by address tables 170 of network devices 160 polled in step 210 as well as address tables 170 of the new network device 160 polled in step 250.

For example, upon inspection of FIGS. 3A-3C, it will be appreciated that address entries 325, 355, and 390 identity configuration information that is shared between address fables 170(1), 170(2), and 170(n). Similarly, address entries 335 and 395 identify additional configuration information that is shared between address tables 170(1) and 170(n). Accordingly, configuration management system 110 may create or modify entries in hash table 130 to associate particular address table configuration information of address table 170(n) with one or more network device identifiers 310/340/370 and/or one or more of address table identifiers 315/345/375.

FIG. 4B illustrates hash table 130 following the performance of step 270 in accordance with an embodiment of the invention. As shown in FIG. 4B, hash table 130 includes changes made to entries 410(1), 410(4), 410(7), and 410(13). As previously described, address entries 325, 355, and 390 identify configuration information that is shared between address fables 170(1), 170(2), and 170(n). Accordingly, hash table entry 410(1) associates the shared configuration information of address entries 325, 355, and 390 with network device identifiers 310/340/370 and address table identifiers 315/345/375 of address tables 170(1)/170(2)/170(n).

Similarly, address entries 335 and 395 of FIGS. 3A and 3C identity additional configuration information that is shared between address tables 170(1) and 170(n). Accordingly, hash table entry 410(7) associates this additional shared configuration information of address entries 335 and 395 with both of network device identifiers 310/370 and both of address table identifiers 315/375.

The remaining configuration information of FIG. 3C (e.g., address entries 380 and 385) is only found in address table 170(n). Accordingly, such configuration information has been added to hash table entries 410(4) and 410(13) and is associated with only network device identifier 370 and address table identifier 375 of address table 170(n).

Figure 5:
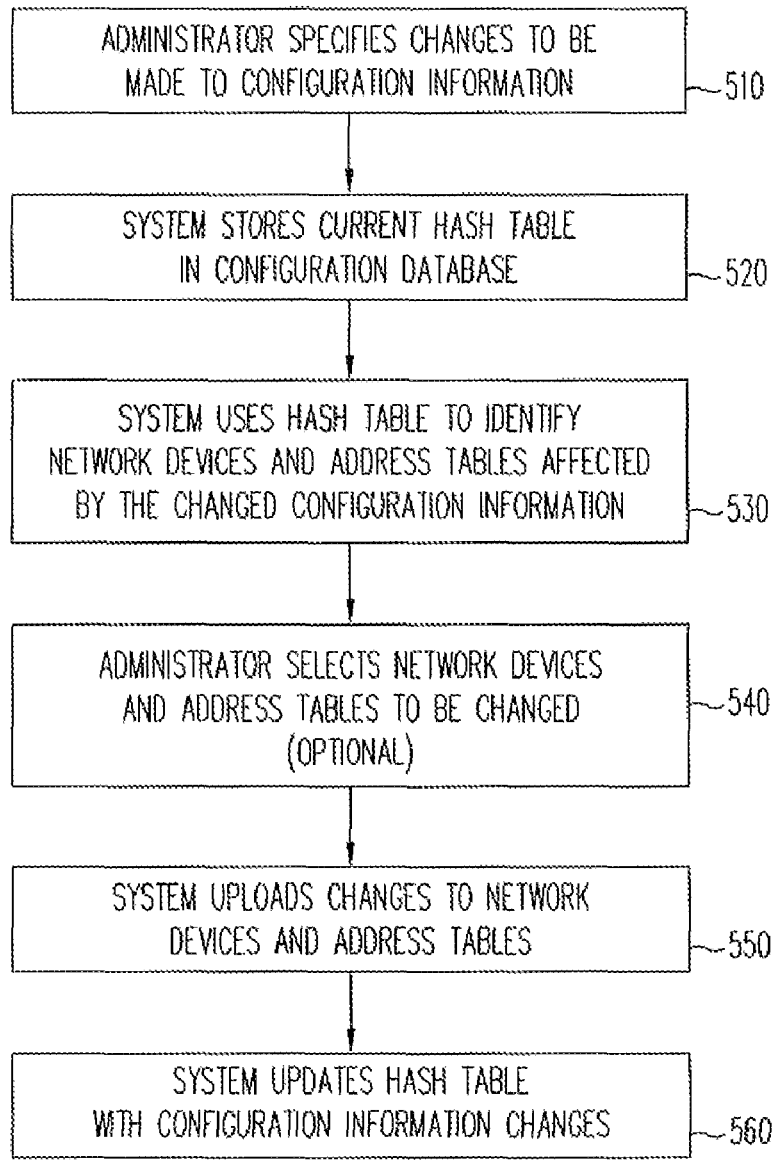
FIG. 5 illustrates a process of deploying configuration changes to network devices using an intersection-based network device management system in accordance with an embodiment of the invention.

FIG. 5 illustrates a process of deploying configuration changes to network devices 160 in accordance with an embodiment of the invention. For example, the process of FIG. 5 may be performed following the performance of the process of FIG. 2.

In step 510, administrator 105 specifies changes to be made to address tables 170 of one or more of network devices 160. For example, in various embodiments, administrator 105 may wish to add, modify, or remove various configuration information stored by one or more of address tables 170. In this regard, administrator 105 may specify one or more address entries to be changed in address tables 170.

In step 520, configuration management system 110 stores the current version of hash table 130 in configuration database 140 as one of previous hash tables 145. As will be further described herein, this may permit configuration management system 310 to conveniently determine previous address table configurations to facilitate roll back to such previous configurations if desired.

In step 530, configuration management system 110 uses hash table 130 to identify particular network devices 160 and address tables 170 affected by the changes specified in previous step 510. As shown and described above with respect to the embodiments of hash table 130 in FIGS. 4A-4B, keys 420 of hash table 130 may correspond to particular address entries stored in one or more of address tables 170. In this regard, all network devices 160 and address tables 170 currently storing a given address entry will be shown as a value 430 associated with a corresponding one of keys 420.

Accordingly, it will be appreciated that the use of hash table 130 can conveniently allow configuration management system 310 to identify the particular network devices 160 and address tables 170 affected by the changes specified in step 510, without requiring configuration management system 310 to parse through the full contents of each one of address tables 170 in response to changes requested by administrator 105.

For example, in one embodiment, administrator 105 may wish to remove all address entries corresponding to configuration information identified as "addr 4157501575 result gt 8665351243 tt 4 gti 2." Accordingly, administrator 105 may specify such configuration information in step 510. Then, in step 530, configuration management system 110 may use the address information "addr 4157501575 result gt 8665351243 tt 4 gti 2" as a key 420 for hash table 130 of FIG. 4B to determine the affected network devices 160 and address tables 170. As shown in FIG. 4B, the specified address information is included in the key 420 corresponding to hash table entry 410(1). Accordingly, by using the specified address information as a key 420, configuration management system 110 can easily identify that the specified address information is associated with address table identifiers 315/345/357 of address tables 170(1)/170(2)/170(n), and is also associated with network device identifiers 310/340/370 of network devices 160(1)/160(2)/160(n).

In optional step 540, administrator 105 may optionally select which of network devices 160 and/or address tables 170 should be changed. In this regard, administrator 105 may be given the opportunity to selectively permit or deny particular changes to desired subsets of network devices 160 and/or address tables 170.

In step 550, configuration management system 110 uploads changes to the particular network devices 160 and address tables 170 identified in step 530 (or optionally in step 540). Continuing the example above, step 550 may include configuration management system 110 sending commands or uploading appropriate data to each of network devices 160(1), 160(2), and 160(n) to remove address entries 325, 355, and 390 from address tables 170(1), 170(2), and 170(n), respectively.

In step 560, configuration management system 110 updates hash table 130 to reflect the changes made in step 550. Continuing the example above, step 560 may include configuration management system 110 removing the contents of hash table entry 410(1) from the embodiment of hash table 130 shown in FIG. 4B because the specified configuration information (e.g., addr 4157501575 result gt 8665351243 tt 4 gti 2) has been removed from address tables 170(1), 170(2), and 170(n) of network devices 160(1), 160(2), and 160(n).

It will be appreciated that in various embodiments where other configuration information has been modified, added, or removed from address tables 170 pursuant to appropriate steps of FIG. 5, such changes may be reflected in corresponding modifications, additions, or removals of appropriate hash table entries 410 of hash table 130. Accordingly, it will be appreciated that following the process of FIG. 5, any changes specified by administrator 105 in step 510 will have been uploaded to corresponding address tables 170 of network devices 160, and will also be reflected in hash table 130 maintained by configuration management server 110.

Figure 6:
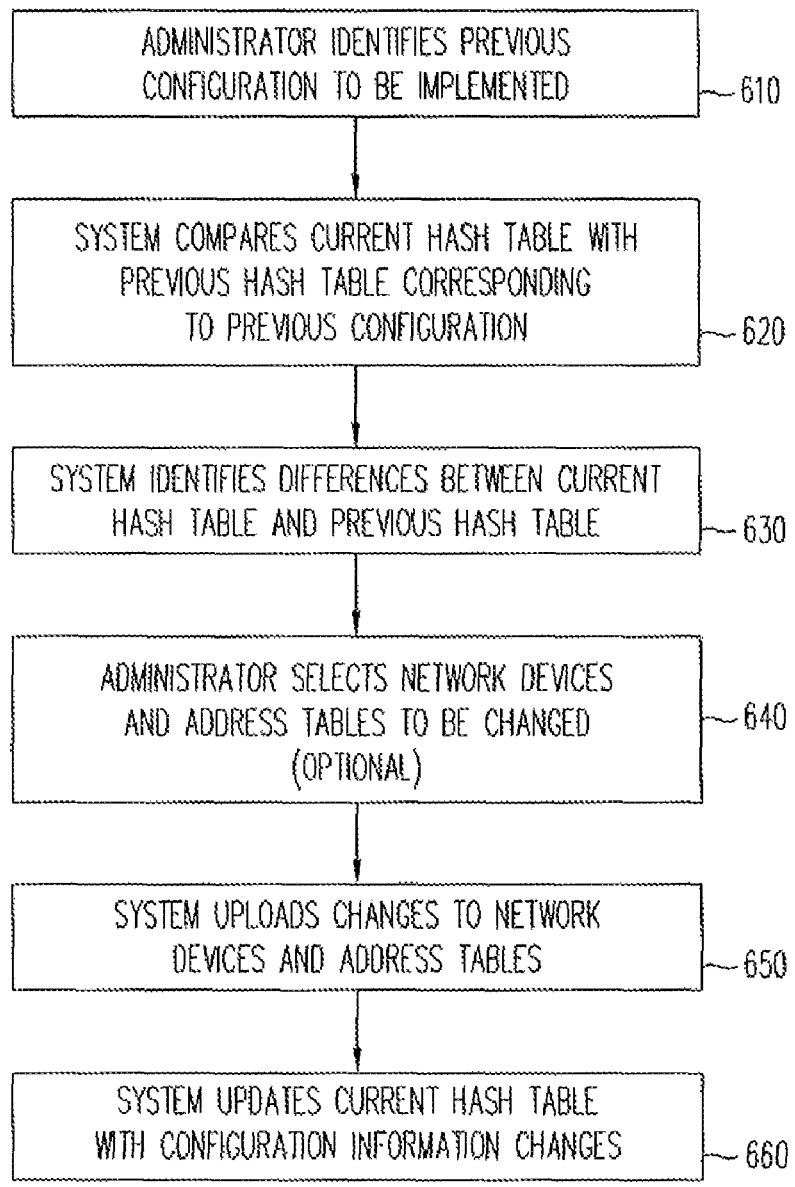
FIG. 6 illustrates a process of rolling back configuration changes to network devices using an intersection-based network device management system in accordance with an embodiment of the invention.

FIG. 6 illustrates a process of rolling back configuration changes to network devices 160 in accordance with an embodiment of tire invention. In step 610, administrator 105 specifies a previous configuration of address tables 170 which administrator 105 desires to implement. For example, in one embodiment, administrator 105 may select a previous hash table 145 from configuration database 140 that was previously stored during step 520 of FIG. 5. In this regard, previous hash table 145 may contain configuration information for address tables 170 prior to the implementation of subsequent changes to address tables 170 in step 550 of FIG. 5.

In step 620, configuration management system 110 compares the current hash table 130 with the previous hash table 145 selected in step 610. As a result, in step 630, configuration management system 110 identifies differences between the current configuration of address tables 170 represented by the current hash table 130 and the previous configuration of address tables 170 represented by the previous hash table 145.

Referring again to the example previously discussed in relation to FIG. 5, it will be appreciated that the contents of hash table entry 410(1) was removed. Continuing this example in the embodiment of FIG. 6, it will be appreciated that during steps 610-630, hash table entry 410(1) of hash table 130 will contain no configuration information, but hash table entry 410(1) of previous hash table 145 will include configuration information corresponding to that shown in the embodiment of FIG. 4B.

If administrator 105 desires to roll back the changes uploaded in step 550 of FIG. 5 (e.g., adding address entries 325, 355, and 390 back to address tables 170(1), 170(2), and 170(n), respectively), then administrator 105 may select previous hash table 145 in step 610. Then, in steps 620 and 630, configuration management system 110 then compares hash table 130 with previous hash table 145 and identifies changes to be made to address tables 170 to return to the configuration of previous hash table 145 (e.g., in the example above, adding address entries 325, 355, and 390 back to address tables 170(1), 170(2), and 170(n), respectively).

In optional step 640, administrator 105 may optionally select which of network devices 160 and/or address tables 170 should be changed. In this regard, administrator 105 may be given the opportunity to selectively permit or deny particular changes to desired subsets of network devices 160 and/or address tables 170.

In step 650, configuration management system 110 uploads changes to the particular network devices 160 and address tables 170 identified in step 630 (or optionally in step 640). Continuing the example above, step 650 may include configuration management system 110 sending commands or uploading appropriate data to each of network devices 160(1), 160(2), and 160(n) to add address entries 325, 355, and 390 to address tables 170(1), 170(2), and 170(n), respectively.

In step 660, configuration management system 110 updates hash table 130 to reflect the changes made in step 650. Continuing the example above, step 660 may include configuration management system 110 adding the contents of hash table entry 410(1) from the embodiment of hash table 130 shown in FIG. 4B back to hash table 130.

It will be appreciated that in various embodiments where steps 620 and 630 indicate that configuration information has been modified, added, or removed from address tables 170 in comparison with previous hash table 145, such changes may be reflected in corresponding modifications, additions, or removals of appropriate hash table entries 410 of hash table 130. Accordingly, following the process of FIG. 6, a previous configuration specified by administrator 105 in step 610 will have been uploaded to corresponding address tables 170 of network devices 160, and will also be reflected in hash table 130 maintained by configuration management server 110.

In view of the present disclosure, it will be appreciated that a configuration management system in accordance with various embodiments described herein may facilitate intersection-based management of configuration data, such as address tables of network devices. Such features can be especially helpful in reducing total operating costs for high volume, time sensitive applications, such as interactive voting systems using ITP MLR and DSMR SMS routing features.

For example, by using a hash table to associate address entries with particular devices and address tables of the network devices, the configuration management system can efficiently identify particular address tables which may be affected by configuration changes. Such implementations can significantly reduce the time associated with identifying affected address tables, especially over brute force, pairwise lexical comparisons. For example, in contrast to brute force approaches that are proportional to the number of address entries, the use of a hash table in accordance with various embodiments disclosed herein may permit affected address entries to be found consistently within a substantially constant time period to permit efficient updating of address entries and address tables.

In addition, configuration errors associated with manual identification of affected address tables can also be reduced. By referring to previously stored versions of the hash table, the configuration management system can also identify particular address entries that have changed since previous configurations, thereby facilitating convenient roll back of configuration changes.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A method comprising:
polling a plurality of network devices to determine address entries stored by address tables of the network devices;
applying a hash function to the address entries to determine a plurality of key-value associations;
maintaining a hash table at a configuration management system separate from the network devices, the hash table comprising the key-value associations,
wherein each key of the hash table corresponds to an address entry stored by one or more of the address tables, wherein each value of the hash table identifies which of the address tables are storing the address entry corresponding to the associated key, and wherein at least one of the key-value associations comprises a single key corresponding to an address entry stored by all of the address tables in a plurality of the address tables and a value that identifies the plurality of address tables; and using the hash table to identify all of the network devices that include a particular address entry and all of the address tables of the network devices that include the particular address entry by:

identifying a particular key of the hash table comprising the particular address entry, selecting a particular value of the hash table associated with the particular key based on a key-value association between the particular value and the particular key, and wherein the particular value identifies all of the network devices storing the particular address entry and all of the address tables of the network devices storing the particular address entry without requiring a parsing of the contents of each of the address tables of the network devices.

2. The method of claim 1, further comprising:
receiving a request to replace a specified one of the address entries with a new address entry;
comparing the specified address entry with the keys of the hash table;
using one of the keys corresponding to the specified address entry to identify any of the address tables storing the specified address entry;
uploading the new address entry to the identified address tables to replace the specified address entry; and
updating the one of the keys corresponding to the specified address entry to correspond to the new address entry.

3. The method of claim 1, further comprising:
receiving a request to remove a specified one of the address entries;
comparing the specified address entry with the keys of the hash table;
using one of the keys corresponding to the specified address entry to identify any of the address tables storing the specified address entry;
uploading a request to the identified address tables to remove the specified address entry; and
removing the key-value association corresponding to the specified address entry from the hash table.

4. The method of claim 1, further comprising:
receiving a request to add a new address entry to a specified one of the address tables;
comparing the new address entry with the keys of the hash table;
if the new address entry corresponds to one of the keys of the hash table, identifying the specified one of the address tables in the value corresponding to the one of the keys;
if the new address entry does not correspond to the keys of the hash table, creating a new key-value association in the hash table, wherein the new key corresponds to the new address entry, wherein the new value identifies the specified one of the address tables; and
uploading the new address entry to the specified one of the address tables.

5. The method of claim 1, further comprising:
polling a new network device to determine address entries stored by a new address table of the new network device;
applying the hash function to the address entries of the new address table; and
maintaining the address entries of the new address table in the hash table.

6. The method of claim 1, further comprising:
receiving a request to roll back the address tables to a previous configuration;
comparing the hash table with a previous version of the hash table corresponding to the previous configuration;
identifying differences between the key-value associations of the hash table and key-value associations of the previous hash table;
uploading address entry changes to the address tables corresponding to the identified differences; and
updating the hash table to correspond to the previous hash table.

7. The method of claim 1, wherein the values of the hash table comprise network device identifiers and address table identifiers.

8. The method of claim 1, wherein the address tables are Internet Protocol (IP) transfer point address tables.

9. The method of claim 1, wherein the address entries identify routing information for short message service (SMS) messages.

10. A configuration management system comprising:
one or more processors; and
a memory storing software which, when executed by the one or more processors, causes the one or more processors to:

maintain a hash table comprising a plurality of key-value associations, wherein each key of the hash table corresponds to an address entry stored by one or more address tables of a plurality of network devices separate from the configuration management system, wherein each value of the hash table identifies which of the address tables are storing the address entry corresponding to the associated key, poll the network devices to determine the address entries stored by the address tables of the network devices, apply a hash function to the address entries to determine the key-value associations, wherein at least one of the key-value associations comprises a single key corresponding to an address entry stored by all of the address tables in a plurality of the address tables and a value that identifies the plurality of address tables, and use the hash table to identify all of the network devices that include a particular address entry and all of the address tables of the network devices that include the particular address entry by:

identifying a particular key of the hash table comprising the particular address entry, selecting a particular value of the hash table associated with the particular key based on a key-value association between the particular value and the particular key, and wherein the particular value identifies all of the network devices storing the particular address entry and all of the address tables of the network devices storing the particular address entry without requiring a parsing of the contents of each of the address tables of the network devices.

11. The configuration management system of claim 10, wherein the software is further adapted to:
receive a request to replace a specified one of the address entries with a new address entry;

compare the specified address entry with the keys of the hash table;

use one of the keys corresponding to the specified address entry to identify any of the address tables storing the specified address entry;

upload the new address entry to the identified address tables to replace the specified address entry; and update the one of the keys corresponding to the specified address entry to correspond to the new address entry.

12. The configuration management system of claim 10, wherein the software is further adapted to:

receive a request to remove a specified one of the address entries;

compare the specified address entry with the keys of the hash table;

use one of the keys corresponding to the specified address entry to identify any of the address tables storing the specified address entry;

upload a request to the identified address tables to remove the specified address entry; and remove the key-value association corresponding to the specified address entry from the hash table.

13. The configuration management system of claim 10, wherein the software is further adapted to:

receive a request to add a new address entry to a specified one of the address tables;

compare the new address entry with the keys of the hash table;

if the new address entry corresponds to one of the keys of the hash table, identify the specified one of the address tables in the value corresponding to the one of the keys;

if the new address entry does not correspond to the keys of the hash table, create a new key-value association in the hash table, wherein the new key corresponds to the new address entry, wherein the new value identifies the specified one of the address tables; and upload the new address entry to the specified one of the address tables.

14. The configuration management system of claim 10, wherein the software is further adapted to:

poll a new network device to determine address entries stored by a new address table of the new network device;

apply the hash function to the address entries of the new address table; and maintain the address entries of the new address table in the hash table.

15. The configuration management system of claim 10, further comprising:

a configuration database comprising a previous version of the hash table; and wherein the software is further adapted to:

receive a request to roll back the address tables to a previous configuration, compare the hash table with a previous version of the hash table corresponding to the previous configuration, identify differences between the key-value associations of the hash table and key-value associations of the previous hash table, upload address entry changes to the address tables corresponding to the identified differences, and update the hash table to correspond to the previous hash table.

16. The configuration management system of claim 10, wherein the values of the hash table comprise network device identifiers and address table identifiers.

17. The configuration management system of claim 10, wherein the address tables are Internet Protocol (IP) transfer point address tables.

18. The configuration management system of claim 10, wherein the address entries identify routing information for short message service (SMS) messages.

19. A configuration management system comprising:

means for polling a plurality of network devices separate from the configuration management system to determine address entries stored by address tables of the network devices;

means for applying a hash function to the address entries to determine a plurality of key-value associations;

means for maintaining the key-value associations, wherein each key corresponds to an address entry stored by one or more of the address tables, wherein each value identifies which of the address tables are storing the address entry corresponding to the associated key, wherein at least one of the key-value associations comprises a single key corresponding to an address entry stored by all of the address tables in a plurality of the address tables and a value that identifies the plurality of address tables; and means for using the hash table to identify all of the network devices that include a particular address entry and all of the address tables of the network devices that include the particular address entry by:

identifying a particular key of the hash table comprising the particular address entry, selecting a particular value of the hash table associated with the particular key based on a key-value association between the particular value and the particular key, and wherein the particular value identifies all of the network devices storing the particular address entry and all of the address tables of the network devices storing the particular address entry without requiring a parsing of the contents of each of the address tables of the network devices.

20. The configuration management system of claim 19, further comprising:

means for receiving a request to roll back the address tables to a previous configuration;

means for identifying differences between the key-value associations of a current configuration of the address tables with key-value associations of the previous configuration of the address tables;

means for uploading address entry changes to the address tables corresponding to the identified differences; and means for updating the key-value associations of the current configuration of the address tables to correspond with the key-value associations of the previous configuration of the address tables.

* * * * *